United States Patent [19]

Becker et al.

[11] Patent Number: 5,202,263
[45] Date of Patent: Apr. 13, 1993

[54] STEEPING VATS FOR MALTHOUSES

[75] Inventors: Karl L. Becker; Francesco Beldevere, both of Madrid, Spain

[73] Assignees: Seeger Industrial, S.A., Madrid, Spain; Inamex de Cerveza y Malta, S.A. de C.V., Texoco, Mexico

[21] Appl. No.: 686,421

[22] Filed: Apr. 16, 1991

[30] Foreign Application Priority Data

Apr. 27, 1990 [ES] Spain .................................. 9001227

[51] Int. Cl.⁵ .............................................. C12C 1/00
[52] U.S. Cl. .................................. 435/306; 435/305; 435/302
[58] Field of Search ..................... 435/302–309, 435/315; 261/83, 85, 87; 366/102–104, 169; 210/219, 620

[56] References Cited

U.S. PATENT DOCUMENTS

| 29,713 | 8/1863 | Patterson | 261/87 |
|---|---|---|---|
| 41,024 | 12/1863 | Smith | 261/87 |
| 41,025 | 12/1863 | Smith | 261/87 |
| 1,195,067 | 8/1916 | Mottram | 261/87 |
| 3,034,895 | 5/1962 | O'Malley | 435/307 |
| 3,849,255 | 11/1974 | Schlimme et al. | 435/309 |
| 4,188,287 | 2/1980 | Faulkner et al. | 261/87 |
| 4,542,683 | 9/1985 | Wilkinson | 435/305 |
| 4,818,445 | 4/1989 | Onizuka et al. | 261/87 |
| 4,955,586 | 9/1990 | Onizuka et al. | 261/87 |
| 5,013,490 | 5/1991 | Tanimoto et al. | 261/87 |

FOREIGN PATENT DOCUMENTS 1255592 12/1971 United Kingdom .

Primary Examiner—Robert J. Warden
Assistant Examiner—Hien Tran
Attorney, Agent, or Firm—McAulay Fisher Nissen Goldberg & Kiel

[57] ABSTRACT

Such improvements consist in using as arm (2) of the machine for loading and unloading the vat, a hollow and hermetically sealed element to which compressed air from a generator (10) has access. The air is channelled through a series of vertical uprights (6) to heads (11) connected in their turn to the said uprights, elongated, in such a way as to extend radially outwardly in a direction from the central column of the machine and adjacent the base (3) of the vat. The heads (11) are provided with lateral air-exit slots. The heads (11) are connected to arm (2) via the vertical uprights (6) for rotation therewith.

In this way a radial air-curtain is formed which, on rotating the arm (2) of the loading/unloading machine, circumferentially sweeps the whole bottom of the vat and consequently stirs, oxygenates, cools and, if relevant, displaces the $CO_2$ from the whole mass of grain, in a uniform way.

6 Claims, 3 Drawing Sheets

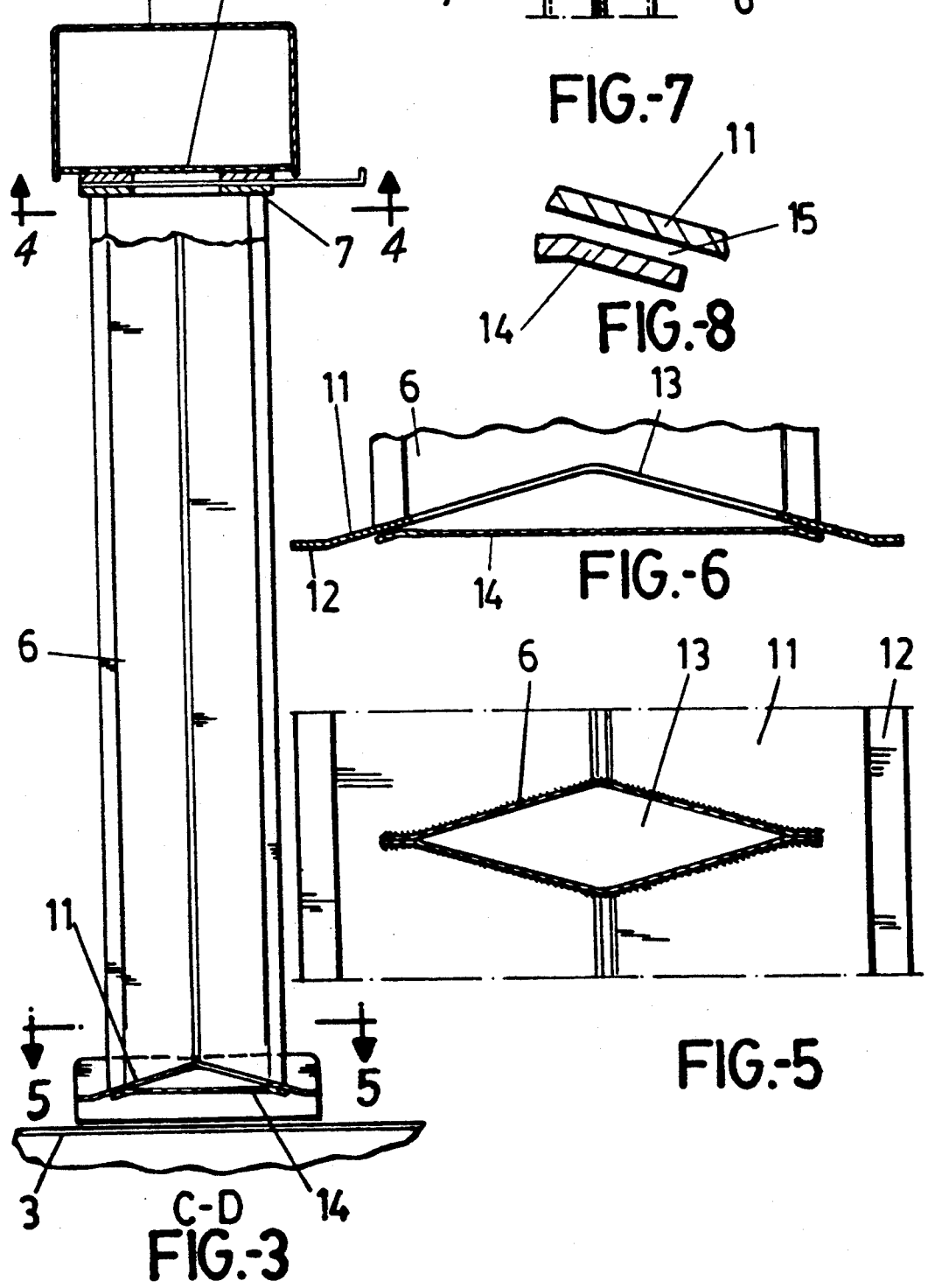

STEEPING VATS FOR MALTHOUSES

SUBJECT OF THE INVENTION

The present invention relates to a series of improvements introduced into steeping vats of the kind used in malthouses and, more particularly, in steeping vats with a flat bottom.

BACKGROUND OF THE INVENTION

As is known, among the various operating phases that are carried out in a malthouse, one of them is that of steeping or pregermination of the barley. During this operating phase, it becomes necessary to stir the product with the purpose of preventing it from caking and consequently achieving uniform humidification at the same time it is necessary to eliminate the $CO_2$ which is produced during the pregermination which must occur in a controlled way so that the grain does not spoil, for which purpose it is also necessary to carry out an appropriate cooling.

This is generally achieved by installing in the base of the steeping vat a plurality of adequately distributed injectors through which compressed air is blown in such a way that the air, on rising between the mass of grain, engenders the stirring of the same, carries out oxygenation of the water, removes the $CO_2$ and also removes the heat produced by the germination.

More specifically, the said injectors are positioned inside a false bottom defined by an upper, perforated sheet through which the air exits. However, this solution which is acceptable in conical-bottomed vats, presents significant problems when the steeping vat is flat-bottomed and above all when the said vat has very considerable dimensions, as occurs in large malthouses.

More specifically, in such cases and so that the air-blowing is effective, it is necessary to arrange the injectors very close to one another, which implies very significant costs, as much for replacement as for maintenance, since the injectors become considerably soiled and require periodic and very frequent exchanges.

DESCRIPTION OF THE INVENTION

The improvements which the invention proposes which, as has previously been stated, have been especially designed for steeping vats with a flat bottom, resolve the previously mentioned problem area completely satisfactorily.

For this purpose and more specifically, such improvements start from the use of the said product loading and unloading machine which includes the vat, and consist in connecting several vertical uprights to the said machine which finish up below in air-blowing heads. In this way, these heads are capable of describing a circumferential path inside the vat, carried by the said machine, by which means a radial air curtain is consequently established which "sweeps" the whole vat, by which means its effectiveness as a means of stirring is fully guaranteed.

Obviously, the vertical uprights are hollow so that the air may have access through them to the lower heads. These heads are radially elongated and preferably interconnect in this direction so that there are no discontinuities in the previously mentioned sweeping curtain. The heads, like the vertical uprights, have a shape which facilitates the "cutting" or advance of the same inside the mass of grain.

More specifically, the uprights have a rhombic cross-section with the major axis coinciding with the direction of advance or sweeping movement. The heads, have in their turn, a very flattened triangular section and include a perimetric air-exit slot which is substantially set back relative to the "attacking edge" of the head equally when the machine displaces in one as in the other direction, with the purpose of avoiding the possibility that such slots may become blocked with the grain.

DESCRIPTION OF THE DRAWINGS

In order to complement the current description and with the aim of helping a better understanding of the characteristics of the invention, there is attached to the present descriptive document, as an integral part of the same, a set of drawings in which, by way of nonlimiting example, the following is represented:

FIG. 3. shows a detail in elevation and in cross-section along line 3—3 of FIG. 1.

FIG. 4. shows a detail in cross-sectional of one of the uprights along line 4—4 of FIG. 3.

FIG. 5. shows another detail in cross-section of the same upright now along line 5—5 of FIG. 3.

FIG. 6. shows a detail in elevation and in cross-section of one of the heads with the initial zone of the corresponding upright with which it is connected.

FIG. 7. shows an enlarged detail of the joining of an upright to the arm of the machine, conforming to the detail (X) of FIG. 1.

FIG. 8 shows an enlarged detail of the air exit slot of a lower head, conforming to the detail (Y) of FIG. 6.

PREFERRED EMBODIMENT OF THE INVENTION

Figure 1:
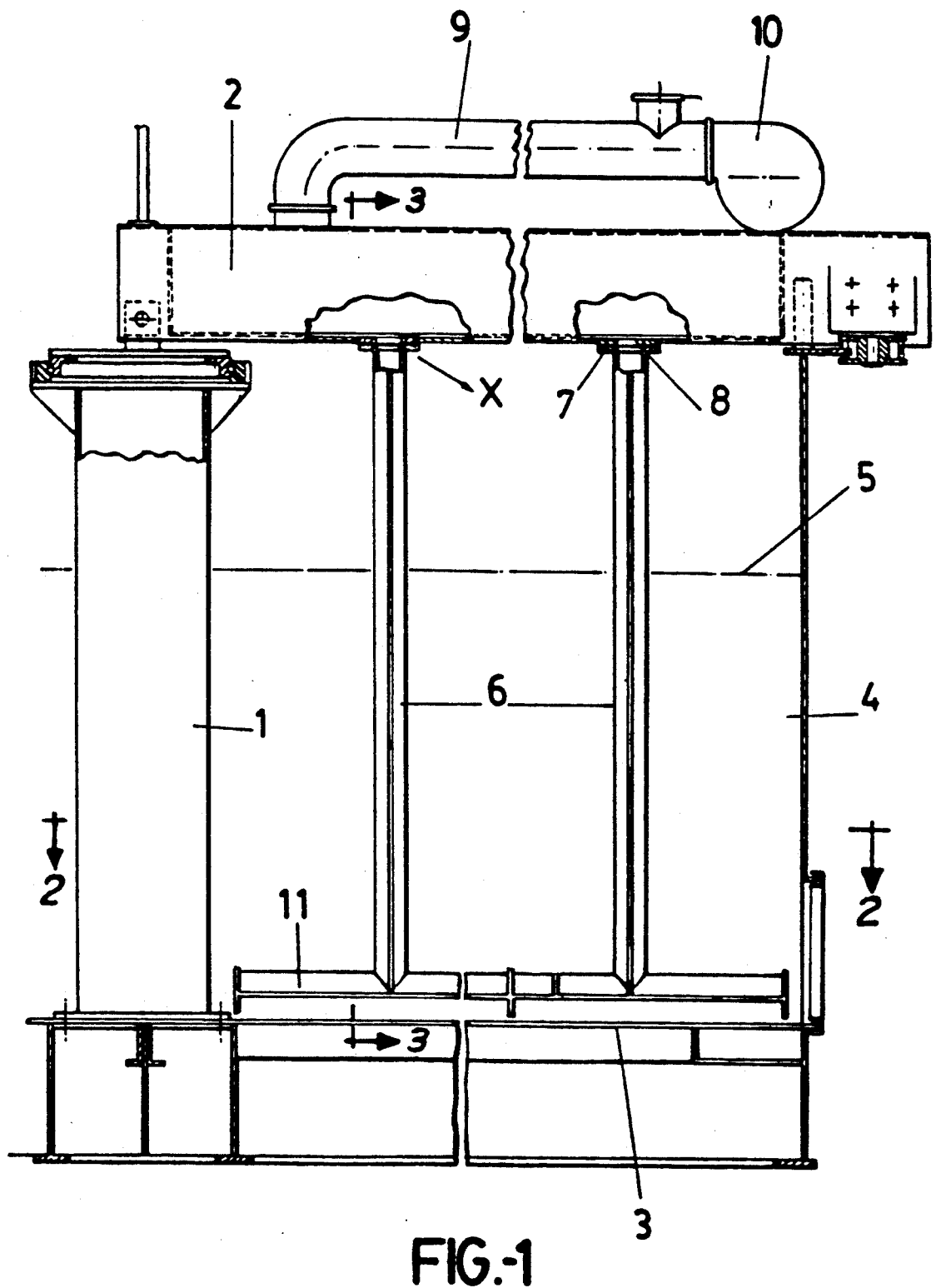
FIG. 1. shows a partial, schematic representation in side elevation of a steeping vat for malthouses which is equipped with the improvements which are the subject of the present invention.

On regarding these figures and, more particularly FIG. 1, it can be seen how the advocated improvements are applicable to steeping vats for malthouses in which a central column (1) is installed on which the sturdy arm (2) of the conventional loading and unloading machine is mounted radially and with freedom of rotation, provided with the necessary endless belts for carrying the product in one or other direction and which has not been shown in the said figure. This vat has a flat bottom (3) such as to configure a cylindrical receptacle (4) into which the grain is introduced so that it will be moistened or humidified by means of a mass of water which will attain a predetermined level (5).

Figure 2:
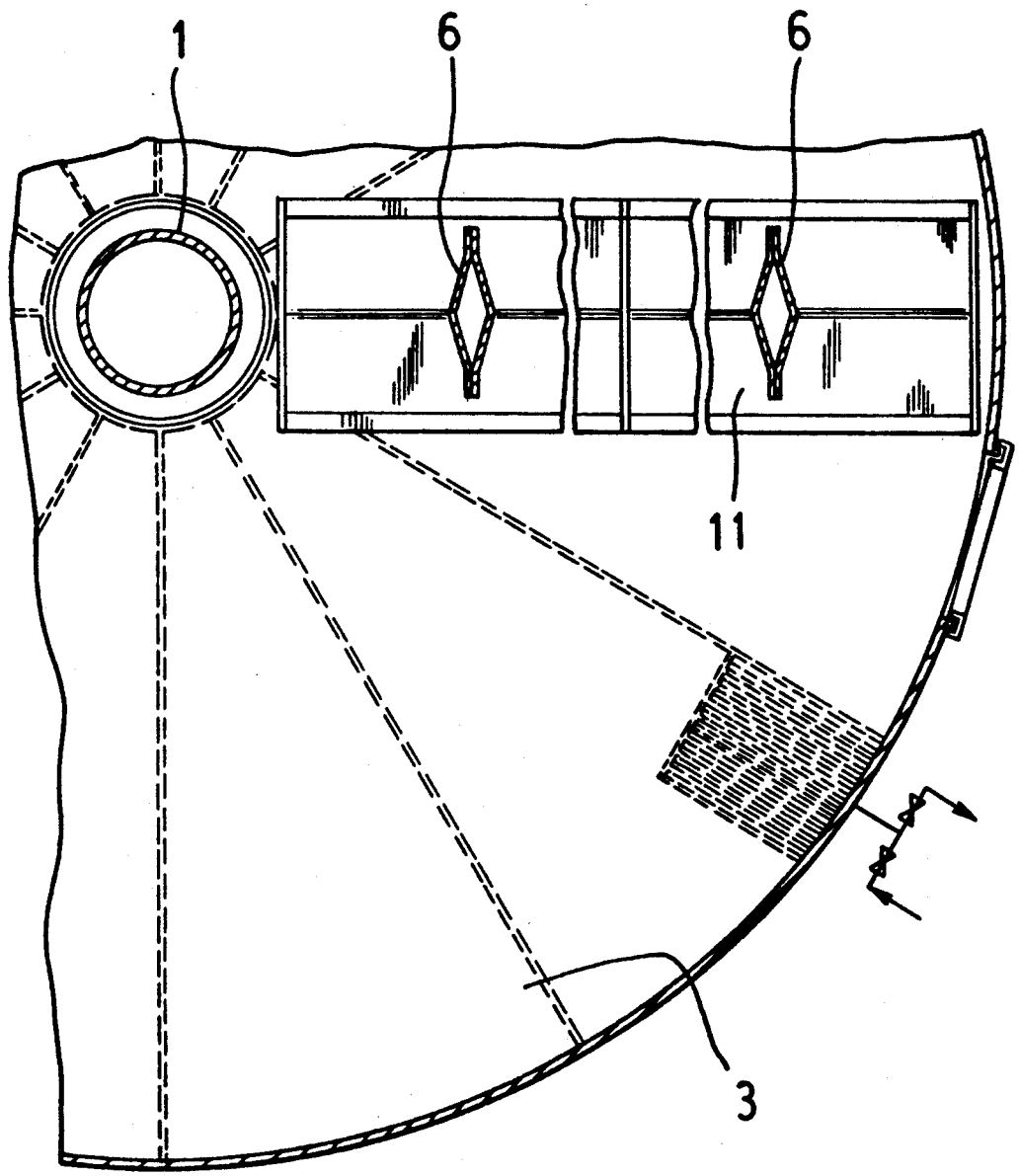
FIG. 2. shows a plan view of the vat of the previous figure sectioned along line 2—2 of the said figure.

Now, on the basis of this basic and conventional construction for the steeping vat, the advocated improvements consist in the fixing to the said arm (2) of the loading and unloading machine of a plurality of vertical, hollow uprights (6) which finish up above in a fixing plate (7) at the base or lower face of the arm (2) by screwing or through any other appropriate means. Orifices (8) for communicating with the uprights (6), as well as an orifice for communicating with a duct (9) through which the compressed air coming from a generator (10) is received, have been provided in the said arm (2). The uprights (6) finish up below in heads (11) which are elongated radially and consequently form between them a continuous line such as is seen in FIGS. 1 and 2.

Each one of these heads (11) is constructed from an angular sheet, markedly obtuse, coinciding with the said head (11), which has the marginal zone (12) of its longitudinal edges bent contrariwise taking up a substantially horizontal plane. The said sheet is provided with a wide window (13) for communicating with the hollow upright (6). A base (14) is situated beneath the window, also constructed from a sheet which, with the previous one, configures a tubular head of triangular, considerably flattened cross-section, as is seen particularly in FIG. 6. The said sheet (14) does not come into contact with the sheet (11) with which it is joined using adequately distributed spacers determining an air-exit slot (15) which is set back and slightly raised relative to the marginal zone (12) of the head. The arrangement is such that it becomes impossible for the grain to be able to gain access to the said slot (15) and cause obstruction of same.

This flattened configuration of the heads (11) and its attack on the mass of grain across an active edge means that the said heads can advance in the mass of grain without the need for a considerable pulling force. The special, rhombic and laterally flattened configuration of the uprights (6), as seen in its turn in FIG. 5, also participates in this effect.

Now in accordance with the described construction, the air generated by the generator (10) reaches, via the duct (9), the hollow interior of the arm (2) which will be suitably hermetically sealed. The air then passes through the orifices (8) to the uprights (6) via which it reaches the heads (11). The air then passes from the heads (11) to the bottom (3) of the vat via the slots (15) which play radially on the whole of the said bottom (3). In this way, an air curtain is obtained which, on rotating the arm (2) on the central column (1), circumferentially "sweeps" the vat by which means the stirring of the grain becomes entirely uniform and effective. The same action occurs with the other complementary operations of oxygenation, elimination of $CO_2$, cooling, etc.

It is not considered necessary to make this description more extensive in order for anybody skilled in the art to understand the scope of the invention and the advantages which derive from same.

The materials, form, size and arrangement of the elements will be susceptible to variation, only insofar as this does not entail any alteration in the essential nature of the invention.

The terms in which this document has been described are always to be taken in a wide and nonlimiting sense.

We claim:

1. In a malthouse having a floorage area for steeping or pregermination of product, a central column in said malthouse, and an arm rotatably mounted on said column and extending radially outwardly therefrom for dispensing the product to said floorage area or gathering the product therefrom; wherein the improvement comprises:
   a hollow upright member disposed vertically within said malthouse and spaced away from said central column, said upright member having an upper end and a lower end;
   a hollow elongated head member disposed horizontally within said malthouse and positioned above and adjacent to said floorage area, said head member projecting in a direction radially outwardly from said central column;
   said head member having air exit slots extending longitudinally along the radially projecting marginal edges of said member;
   the upper end of said upright member being connected to said arm to provide internal communication therebetween;
   the lower end of said upright member being connected to said head member to provide internal communication therebetween;
   said head member being connected to said arm via said upright member for conjoint rotation with said arm; and
   means for conveying air under pressure internally to said arm;
   whereby compressed air conveyed internally to said arm is transmitted to said head member via said upright member and exits from said head member via said exit slots in a circumferentially sweeping motion relative to said floorage area upon rotation of said arm.

2. The malthouse of claim 1, wherein said head member comprises an upper angled sheet and a lower flattened sheet defining therebetween the hollow interior of said member, said upper sheet having a central portion spaced from said lower sheet and side portions which project downwardly toward said lower sheet to define a generally triangular cross-section of said member, the radially extending marginal edges of said upper sheet projecting beyond the corresponding marginal edges of said lower sheet, and the marginal edges of said lower sheet being slightly spaced from said side portions to define therebetween said air exit slots located inwardly of the marginal edges of said upper sheet and at a position higher than the marginal edges of said upper sheet to reduce the likelihood of the product entering said slots.

3. The malthouse of claim 2, wherein said upright member is of a rhombic cross-sectional configuration with a major axis coinciding with a directional movement thereof, the configuration of said upright member and said head member defining cutting edges oriented in the directional movement of said members to reduce resistance to advancement thereof through the product upon rotation of said arm.

4. In a malthouse having a floorage area for steeping or pregermination of a product, a central column in said malthouse, and arm rotatably mounted on said column and extending radially outwardly therefrom for dispensing the product to said floorage area or gathering the product therefrom; wherein the improvement comprises:
   a plurality of hollow upright members disposed vertically within said malthouse, each of said upright members having an upper end and a lower end;
   a plurality of hollow elongated head members disposed horizontally within said malthouse and positioned above and adjacent to said floorage area, said head members being axially aligned to each other and projecting in a direction radially outwardly from said central column;
   each of said head members having air exit slots extending longitudinally along the radially projecting marginal edges of said members;
   the upper ends of said upright members being connected to said arm to provide internal communication therebetween;

the lower end of each of said upright members being connected to each associated head member to provide internal communication therebetween;

said head members being connected to said arm via said upright members for conjoint rotation with said arm; and means for conveying air under pressure internally to said arm;

whereby compressed air conveyed internally to said arm is transmitted to said head members via said upright members and exits from said head members via said exit slots in a circumferentially sweeping motion relative to said floorage area upon rotation of said arm.

5. The malthouse of claim 4, wherein each of said head members comprises an upper angled sheet and a lower flattened sheet defining therebetween the hollow interior of said members, said upper sheet having a central portion spaced from said lower sheet and side portions which project downwardly toward said lower sheet to define a generally triangular cross-section of said member, the radially extending marginal edges of said upper sheet projecting beyond the corresponding marginal edges of said lower sheet, and the marginal edges of said lower sheet being slightly spaced from said side portions to define therebetween said air exit slots located inwardly of the marginal edges of said upper sheet and at a position higher than the marginal edges of said upper sheet to reduce the likelihood of the product entering said slots.

6. The malthouse of claim 5, wherein each of said upright members is of a rhombic cross-sectional configuration with a major axis coinciding with a directional movement thereof, the configuration of said upright members and said head members defining cutting edges oriented in the directional movement of said members to reduce the resistance to the advancement thereof through the product upon rotation of said arm.

* * * * *